United States Patent
Iwasa et al.

(10) Patent No.: US 12,515,524 B2
(45) Date of Patent: Jan. 6, 2026

(54) DISPLAY CONTROL DEVICE AND DISPLAY CONTROL METHOD THEREOF

(71) Applicant: Honda Motor Co., Ltd., Tokyo (JP)

(72) Inventors: Tatsuya Iwasa, Saitama (JP); Haruko Okuyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/628,791

(22) Filed: Apr. 7, 2024

(65) Prior Publication Data

US 2024/0367522 A1 Nov. 7, 2024

(30) Foreign Application Priority Data

May 5, 2023 (CN) .......................... 202310497199.2

(51) Int. Cl.
 *B60K 35/81* (2024.01)
 *B60K 35/28* (2024.01)
(52) U.S. Cl.
 CPC .............. *B60K 35/81* (2024.01); *B60K 35/28* (2024.01); *B60K 2360/177* (2024.01); *B60K 2360/178* (2024.01); *B60K 2360/188* (2024.01); *B60K 2360/191* (2024.01)
(58) Field of Classification Search
 None
 See application file for complete search history.

(56) References Cited

U.S. PATENT DOCUMENTS

| | | | |
|---|---|---|---|
| 11,926,344 B1 * | 3/2024 | Roy | G08G 1/04 |
| 2016/0325676 A1 * | 11/2016 | Yamada | G06V 20/58 |
| 2017/0080952 A1 * | 3/2017 | Gupta | B60K 35/81 |
| 2020/0180502 A1 * | 6/2020 | Mitsuya | G08G 1/16 |
| 2021/0300259 A1 * | 9/2021 | Shibata | B60R 11/0229 |
| 2021/0380115 A1 * | 12/2021 | Alpert | G06N 3/02 |
| 2023/0046484 A1 * | 2/2023 | Fang | B60K 35/00 |
| 2024/0412632 A1 * | 12/2024 | Iriya | B62D 15/027 |

FOREIGN PATENT DOCUMENTS

JP  2016057221  4/2016

\* cited by examiner

*Primary Examiner* — John W Miller
(74) *Attorney, Agent, or Firm* — JCIPRNET

(57) ABSTRACT

The disclosure provides a display control device and a display control method thereof. The display control device controls a display device to project an information image representing a target recognition vehicle in a first mode on a screen member. The screen member is provided between the target recognition vehicle and a user of the vehicle. When a traveling direction of the target recognition vehicle intersects with a traveling direction of the vehicle, the display control device controls the display device to project the information image in a second mode on the screen member. The information image in the second mode includes an image simulating a vehicle headlight beam of the target recognition vehicle.

5 Claims, 5 Drawing Sheets

DISPLAY CONTROL DEVICE AND DISPLAY CONTROL METHOD THEREOF

CROSS-REFERENCE TO RELATED APPLICATION

This application claims the priority benefit of China application serial no. 202310497199.2, filed on May 5, 2023. The entirety of the above-mentioned patent application is hereby incorporated by reference herein and made a part of this specification.

TECHNICAL FIELD

The disclosure relates to a control device, and more particularly to a display control device and a display control method thereof.

DESCRIPTION OF RELATED ART

In recent years, efforts to provide access to sustainable transportation systems that also take into account vulnerable persons among traffic participants have been active. In order to achieve the stated purpose, research and development efforts are made to further improve the safety or convenience of transportation through research and development related to preventive safety technologies.

In conventional preventive safety technology, information may be provided to the driver through a display installed on the vehicle, and the driver must understand the information content provided by the display within a short time to avoid affecting driving safety.

Thus, how to provide simple and easy-to-understand prompt message and improve preventive safety technology to further improve traffic safety and convenience is one of the major efforts.

SUMMARY

The disclosure provides a display control device and a display control method thereof, which may provide the user of the vehicle with a prompt message that is easy to understand, thereby greatly improving the driving safety of the vehicle and providing a sustainable transportation system that may improve traffic safety and convenience.

The display control device of the disclosure is adapted for a vehicle. The display control device controls a display device to project an information image representing a target recognition vehicle in a first mode on a screen member. The screen member is provided between the target recognition vehicle and a user of the vehicle. The display control device includes an object location acquisition unit, and the object location acquisition unit acquires location information of the target recognition vehicle. When a traveling direction of the target recognition vehicle intersects with a traveling direction of the vehicle, the display control device controls the display device to project the information image in a second mode on the screen member. The information image in the second mode includes an image simulating a vehicle headlight beam of the target recognition vehicle.

The disclosure further provides a display control method of a display control device adapted for vehicle, and the display control method of the display control device is described below. Location information of a target recognition vehicle is acquired. Whether a traveling direction of the target recognition vehicle intersects with a traveling direction of the vehicle is determined. When the traveling direction of the target recognition vehicle does not intersect with the traveling direction of the vehicle, an information image representing the target recognition vehicle is projected in a first mode on a screen member. The screen member is provided between the target recognition vehicle and the user. When a traveling direction of the target recognition vehicle intersects with a traveling direction of the vehicle, the information image is projected in a second mode on the screen member. The information image in the second mode includes an image simulating the vehicle headlight beam of the target recognition vehicle.

Based on the above, when the traveling direction of the target recognition vehicle intersects with the traveling direction of the vehicle, the display control device in the embodiment of the disclosure may control the display device to project the information image in the second mode on the screen member. The information image in the second mode includes an image simulating the vehicle headlight beam of the target recognition vehicle. In this way, the image that simulates the vehicle headlight beam of the target recognition vehicle is used to notify the user of the vehicle, so that the user of the vehicle may quickly grasp the location information and the traveling direction of the target recognition vehicle, thereby significantly improving the driving safety of the vehicle and providing a sustainable transportation system that may improve traffic safety and convenience.

In order to make the aforementioned features and advantages of the disclosure comprehensible, embodiments accompanied with drawings are described in detail below.

DESCRIPTION OF THE EMBODIMENTS

Figure 1:
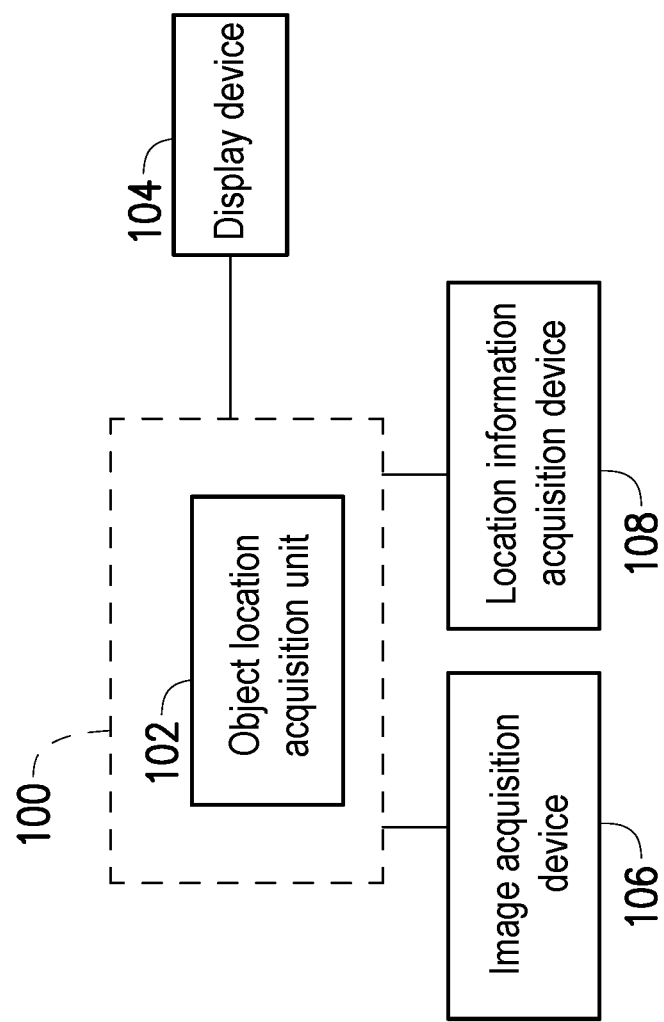
FIG. 1 is a schematic view of a display control device adapted for a vehicle according to the embodiment of the disclosure.

In order that the contents of the disclosure may be more comprehensible, the following embodiments are given as examples according to which the disclosure may be implemented. In addition, wherever possible, components/parts using the same reference numerals in the accompanying drawings and embodiments represent the same or similar parts.

In one embodiment of the disclosure, the information image in the second mode is an image whose color gradually fades in the traveling direction of the target recognition vehicle.

In one embodiment of the disclosure, the information image in the second mode is a white image.

In one embodiment of the disclosure, the information image in the second mode is a yellow image.

In one embodiment of the disclosure, the display control device controls the display device to project the information image on the screen member so that the user is able to see the information image superimposed on the target recognition vehicle.

FIG. 1 is a schematic view of a display control device adapted for a vehicle according to the embodiment of the disclosure. Referring to FIG. 1, a display control device 100 may be coupled to a display device 104, an image acquisition device 106, and a location information acquisition device 108. The display device 104 may be, for example, a head-up display (HUD), and the display device 104 may display an image by projecting on the screen member. The screen member is provided between the user of the vehicle (e.g., the driver) and the objects located outside the vehicle (e.g., cars, motorcycles, bicycles, etc., but not limited thereto), and the screen member may be, for example, the front window of the vehicle, but not limited thereto. In some embodiments, the screen member may also be, for example, the rear window or the side window. The image acquisition device 106 may be, for example, a camera, which is installed on the vehicle to capture the image outside vehicle. For example, the image capturing may be performed in the traveling direction of the vehicle to generate a captured image, but it is not limited thereto. In the case where the image acquisition device 106 includes multiple cameras, the image acquisition device 106 may also capture images in different directions. The location information acquisition device 108 is configured to acquire location information of the object surrounding the vehicle, such as the location information of other vehicles, motorcycles, bicycles, etc., surrounding the vehicle. The location information acquisition device 108 may, for example, include a wireless communication device. In the case where the vehicle is able to communicate with other surrounding vehicles, the location information acquisition device 108 may receive location information of other vehicles from other vehicles through wireless communication. In the case where the vehicle is not able to communicate with other surrounding vehicles, the location information acquisition device 108 may, for example, through connecting to a cloud server, acquire information from a road monitoring camera (e.g., image information of other vehicles captured by the road monitoring camera and the location information of the road monitoring camera), thereby acquiring the location information of other vehicles that are not able to communicate. In some embodiments, the location information acquisition device 108 may also include an image acquisition device 106, that is, the location information acquisition device 108 may also acquire the location information of other vehicles captured by the image acquisition device 106 based on the captured image of the image acquisition device 106.

In addition, the display control device 100 may control the display device 104 to project an information image representing the location of a target recognition vehicle in a first mode or a second mode on the screen member. The target recognition vehicle may be, for example, other vehicles that have a greater probability of colliding with the vehicle, such as other cars, motorcycles, or bicycles in the traveling direction of the vehicle. However, it is not limited thereto. The target recognition vehicle may also be a vehicle within a default range around the vehicle and not limited to the vehicle in front of the vehicle. In addition, the first mode and the second mode correspond to different information images, for example, corresponding to information images of different shapes. The display control device 100 may include an object location acquisition unit 102. The object location acquisition unit 102 may be implemented by, for example, a processor, an electronic control unit (ECU), or a microcontroller unit (MCU), but is not limited thereto.

The object location acquisition unit 102 may acquire the location information of the target recognition vehicle from the location information acquisition device 108. In some embodiments, the object location acquisition unit 102 may also acquire the location information of the target recognition vehicle captured by the image acquisition device 106 based on the captured image of the image acquisition device 106. In addition, the display control device 100 may also determine the traveling direction of the target recognition vehicle based on the location information of the target recognition vehicle. For example, the traveling direction of the target recognition vehicle may be determined based on the location information of the target recognition vehicle changing over time. When the traveling direction of the target recognition vehicle does not intersect with the traveling direction of the vehicle provided with the display control device 100, (e.g., when the traveling direction of the target recognition vehicle is the same direction or the opposite direction as the traveling direction of the vehicle provided with the display control device 100), the display control device 100 may control the display device 104 to project the information image representing the location information of the target recognition vehicle in the first mode on the screen member.

Figure 2:
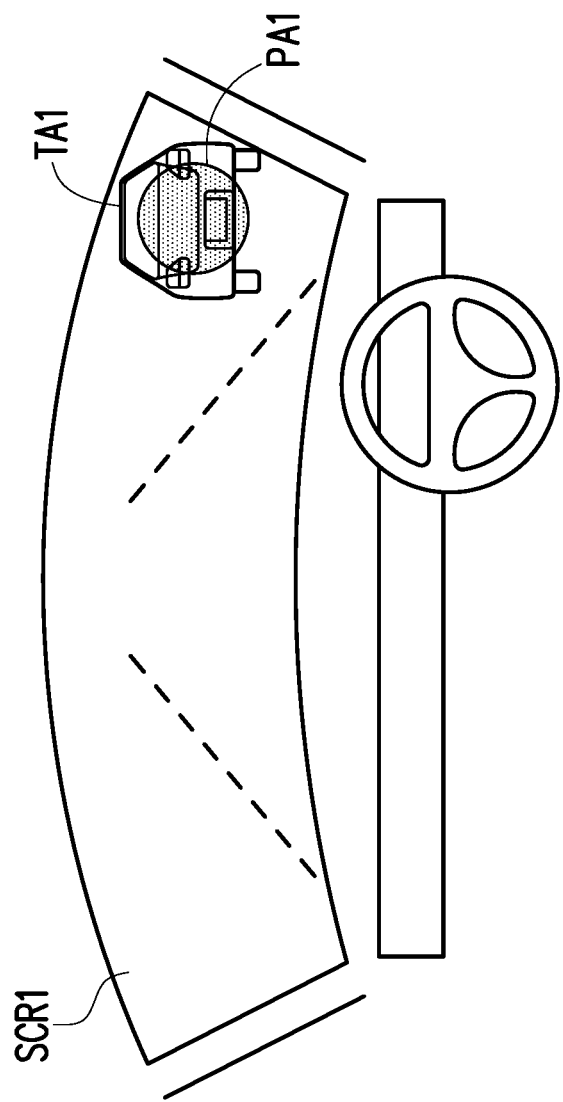
FIG. 2 is a schematic view of a projected information image according to the embodiment of the disclosure.

For example, as shown in FIG. 2, it is assumed that in the embodiment of FIG. 2, the screen member is the front window SCR1 of the vehicle, and the target recognition vehicle is a vehicle TA1 on the right front of the vehicle. The display control device 100 may control the display device 104 to project the information image PA1 representing the location of the vehicle TA1 in the first mode on the front window SCR1, so that the user of the vehicle is able to see the information image PA1 superimposed on the vehicle TA1. In this embodiment, the information image PA1 is a solid circle pattern, but it is not limited thereto. In other embodiments, the information image PA1 may also be, for example, a solid triangle pattern, a square pattern, or a pattern of other shapes. It is worth noting that in some embodiments, the display control device 100 may also control the display device 104 to project the information image PA1 at other positions on the front window SCR1, and is not limited to enabling the user of the vehicle to see the information image PA1 superimposed on the vehicle TA1; that is, the display device 104 may also be controlled to project the information image PA1 at a position near the vehicle TA1 instead of superimposing on the vehicle TA1 (from the perspective of the user of the vehicle). Alternatively, the display device 104 may also be controlled to project the information image PA1 in other ways that may express the relative positional relationship between the vehicle driven by the user and the vehicle TA1, for example, to project the information image PA1 at any position on the right half of the front window SCR1, but not limited thereto.

In addition, when the traveling direction of the target recognition vehicle intersects with the traveling direction of the vehicle provided with the display control device 100 (e.g., when the traveling direction of the target recognition vehicle intersects perpendicularly with the traveling direction of the vehicle provided with the display control device 100, but not limited thereto), the display control device 100 may control the display device 104 to project the information image representing the target recognition vehicle in the second mode on the screen member. The information image in the second mode is an image simulating a vehicle headlight beam of the target recognition vehicle, for example, the information image in the second mode is an image whose color gradually fades in the traveling direction of the target recognition vehicle, so that the user of the vehicle may determine the location and the traveling direction of the target recognition vehicle through the information image in the second mode.

Figure 3:
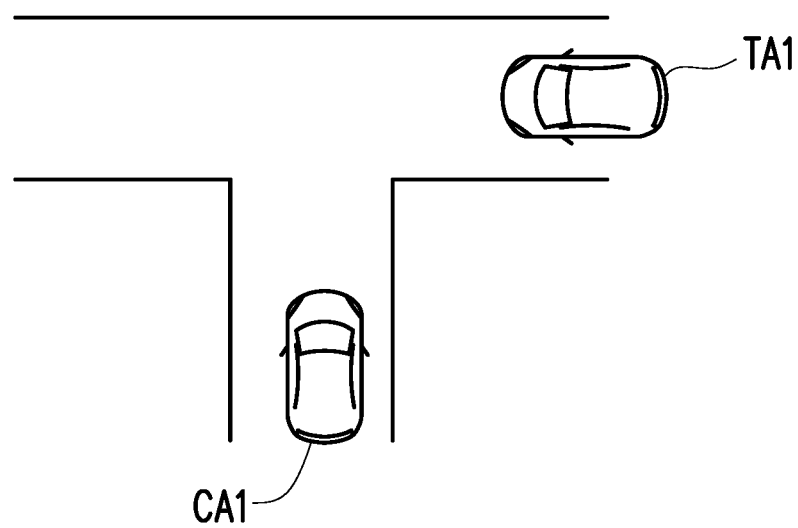
FIG. 3 is a location schematic view of a vehicle with a display control device and a target recognition vehicle according to the embodiment of the disclosure.
Figure 4:
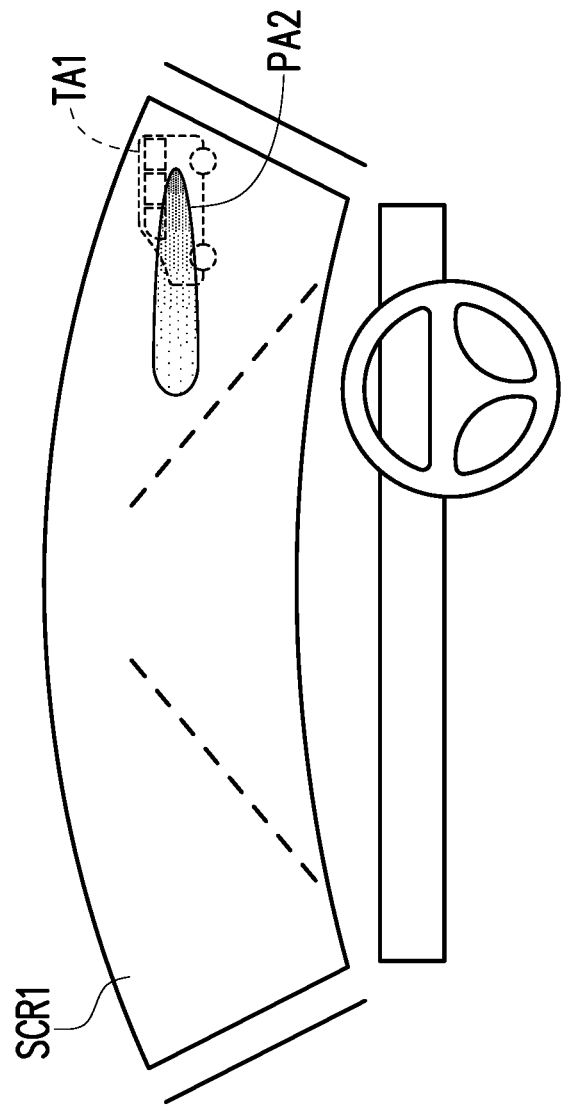
FIG. 4 is a schematic view of a projected information image according to another embodiment of the disclosure.

For example, as shown in FIG. 3, it is assumed that a vehicle CA1 is a vehicle provided with the display control device 100, the vehicle TA1 is the target recognition vehicle, and the traveling direction of the vehicle TA1 is a direction from the right to the left that intersects perpendicularly with the traveling direction of the vehicle CA1. In the embodiment of FIG. 3, the display control device 100 may control the display device 104 to project the information image PA2 representing the vehicle TA1 in the second mode on the front window SCR1 as shown in FIG. 4, so that the user of the vehicle is able to see the information image PA2 superimposed on the vehicle TA1. The information image PA2 is an image whose color gradually fades in the traveling direction of the vehicle TA1. That is, the information image PA2 has a darker color in the part nearer to the right and a lighter color in the part nearer to the left to simulate the situation where the intensity of the vehicle headlight beam of the vehicle TA1 becomes weaker as the irradiation distance increases. The color of the information image PA2 may be, for example, white or yellow, which simulates the color of the vehicle headlight beam, but is not limited thereto, and the color of the information image PA2 may also be other colors. In this way, the image that simulates the vehicle headlight beam of the vehicle TA1 is used to notify the user of the vehicle CA1, so that the user of the vehicle CA1 may quickly grasp the location information and the traveling direction of the vehicle TA1, thereby significantly improving the driving safety of the vehicle CA1 and providing a sustainable transportation system that may improve traffic safety and convenience. Similarly, in other embodiments, the display control device 100 may also control the display device 104 to project the information image PA2 at a location that is not superimposed on the vehicle TA1 (from the perspective of the user of the vehicle).

It is worth noting that in the embodiments in FIG. 2 to FIG. 4, the front window is used as an example for illustration. However, in other embodiments, the screen member is not limited to the front window, for example, the screen member may also be the rear window. Similarly, the display control device 100 may also control the display device 104 to project the information image representing the target recognition vehicle in the first mode or the second mode on the rear window, so that when the user of the vehicle is performing backing, the location information and the traveling direction of the target recognition vehicle may also be known through the information image on the rear window glass, which may improve the driving safety of the vehicle CA1. In addition, in some embodiments, the screen member may also be, for example, the side window. The display control device 100 may also control the display device 104 to project the information image representing the location information and the traveling direction of the target recognition vehicle in the first mode or the second mode on the side window, thereby enabling the driver to have a more comprehensive grasp of the surrounding conditions of the vehicle CA1.

Figure 5:
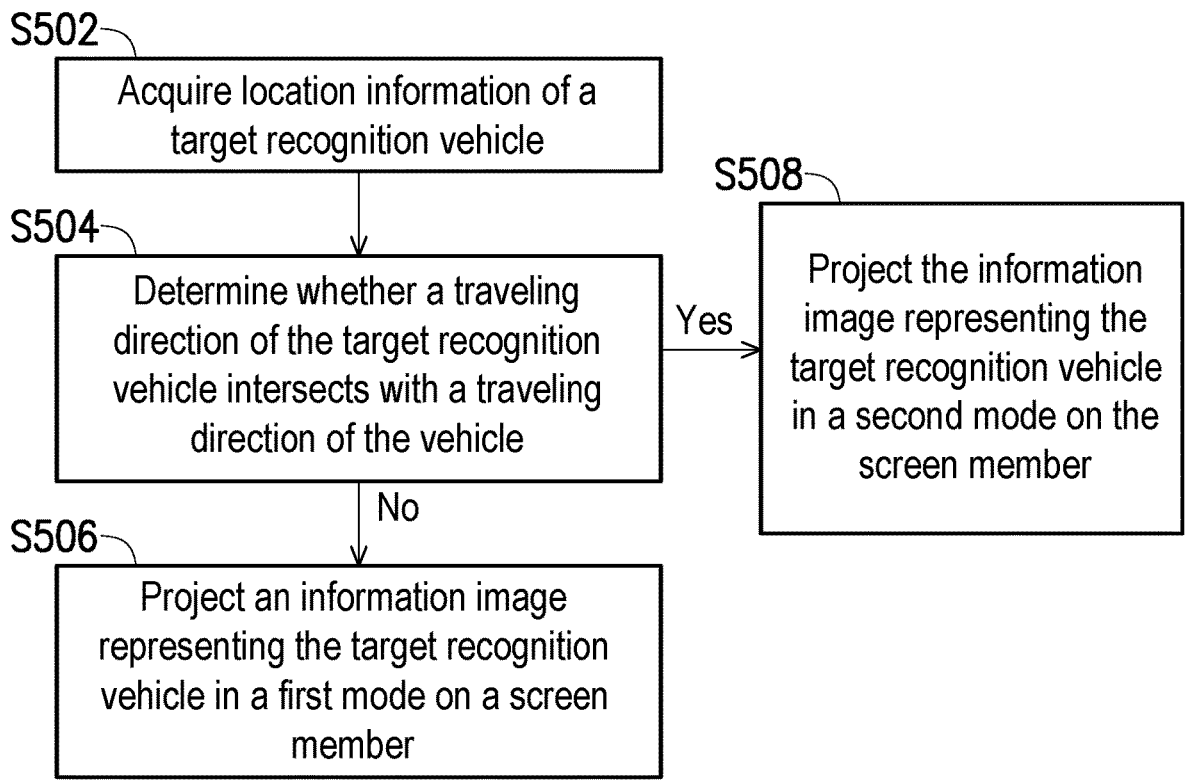
FIG. 5 is a flow chart of a display control method of a display control device according to the embodiment of the disclosure.

FIG. 5 is a flow chart of a display control method of a display control device adapted for a vehicle according to the embodiment of the disclosure. It may be seen from the above embodiment that the display control method of the display control device may include the following steps. First, location information of a target recognition vehicle is acquired (step S502). Next, whether a traveling direction of the target recognition vehicle intersects with a traveling direction of the vehicle is determined (step S504). When the traveling direction of the target recognition vehicle does not intersect with the traveling direction of the vehicle, an information image representing the target recognition vehicle is projected in a first mode on a screen member (step S506). The screen member is provided between the target recognition vehicle and a user of the vehicle, and the projection position of the information image on the screen member may be, for example, a position where the user of the vehicle is able to see the information image superimposed on the target recognition vehicle, but it is not limited thereto. When the traveling direction of the target recognition vehicle intersects with the traveling direction of the vehicle, the information image representing the target recognition vehicle is projected in a second mode on the screen member (step S508). The information image in the second mode is an image simulating a vehicle headlight beam of the target recognition vehicle.

To sum up, when the traveling direction of the target recognition vehicle intersects with the traveling direction of the vehicle, the display control device in the embodiment of the disclosure may control the display device to project the information image in the second mode on the screen member. The information image in the second mode includes an image simulating the vehicle headlight beam of the target recognition vehicle. In this way, the image that simulates the vehicle headlight beam of the target recognition vehicle is used to notify the user of the vehicle, so that the user of the vehicle may quickly grasp the location information and the traveling direction of the target recognition vehicle, thereby significantly improving the driving safety of the vehicle and providing a sustainable transportation system that may improve traffic safety and convenience.

Although the disclosure has been disclosed by embodiments as above, it is not intended to limit the disclosure. Any person skilled in the art, without departing from the spirit and scope of the disclosure, may make certain changes and modifications so that the scope of protection of the disclosure shall be subject to the claims as defined.

What is claimed is:

1. A display control device adapted for a vehicle, wherein the display control device controls a display device to project an information image representing a target recognition vehicle in a first mode on a screen member, the screen member is provided between the target recognition vehicle and a user of the vehicle, and the display control device comprises:
   an object location acquisition unit, acquiring location information of the target recognition vehicle,
   wherein when a traveling direction of the target recognition vehicle intersects with a traveling direction of the vehicle, the display control device controls the display device to project the information image in a second mode on the screen member, and the information image in the second mode comprises an image simulating a vehicle headlight beam of the target recognition vehicle, wherein the information image in the second mode is an image whose color gradually fades to show the traveling direction in which the target recognition vehicle is moving.

2. The display control device according to claim 1, wherein the information image in the second mode is a white image.

3. The display control device according to claim 1, wherein the information image in the second mode is a yellow image.

4. The display control device according to claim 1, wherein the display control device controls the display device to project the information image on the screen member so that the user is able to see the information image superimposed on the target recognition vehicle.

5. A display control method of a display control device adapted for vehicle, comprising:
   acquiring location information of a target recognition vehicle;
   determining whether a traveling direction of the target recognition vehicle intersects with a traveling direction of the vehicle;
   projecting an information image representing the target recognition vehicle in a first mode on a screen member when the traveling direction of the target recognition vehicle does not intersect with the traveling direction of the vehicle, wherein the screen member is provided between the target recognition vehicle and a user of the vehicle; and
   projecting the information image in a second mode on the screen member when the traveling direction of the target recognition vehicle intersects with the traveling direction of the vehicle, wherein the information image in the second mode comprises an image simulating a vehicle headlight beam of the target recognition vehicle, wherein the information image in the second mode is an image whose color gradually fades to show the traveling direction in which the target recognition vehicle is moving.

\* \* \* \* \*